United States Patent [19]

Kent et al.

[11] Patent Number: 4,830,838

[45] Date of Patent: May 16, 1989

[54] REMOVAL OF HYDROGEN SULFIDE FROM FLUID STREAMS WITH MINIMUM PRODUCTION OF SOLIDS

[75] Inventors: Van A. Kent; William R. Behr; Larry H. Kirby, all of Lake Jackson, Tex.

[73] Assignee: The Dow Chemical Company, Midland, Mich.

[21] Appl. No.: 265,613

[22] Filed: Nov. 1, 1988

[51] Int. Cl.[4] .................. C01B 17/16; C01B 31/20
[52] U.S. Cl. ..................... 423/226; 423/573.1; 423/576.5; 423/576.6
[58] Field of Search .............. 423/573.1, 576.5, 576.6, 423/226

[56] References Cited

U.S. PATENT DOCUMENTS

| | | | |
|---|---|---|---|
| 3,446,595 | 5/1969 | Guerrieri | 423/222 |
| 3,447,903 | 6/1969 | Wiewiorowski | 423/567 |
| 3,851,050 | 11/1974 | Groenendaal et al. | 423/574 |
| 3,859,414 | 1/1975 | Urban | 423/222 |
| 4,009,251 | 1/1977 | Meuly | 423/576.6 |
| 4,123,506 | 10/1978 | Sperack | 423/566 |
| 4,196,183 | 4/1980 | Li | 423/576.2 |
| 4,202,864 | 5/1980 | Sperack | 423/220 |
| 4,414,817 | 11/1983 | Jernigan | 423/226 |
| 4,451,442 | 5/1984 | Jeffrey et al. | 423/224 |
| 4,622,212 | 11/1986 | McManus et al. | 423/226 |
| 4,629,608 | 12/1986 | Lampton et al. | 423/226 |

Primary Examiner—Gregory A. Heller
Attorney, Agent, or Firm—Daniel N. Lundeen; Benjamin G. Colley

[57] ABSTRACT

Fluid streams containing hydrogen sulfide from a steam tubine or from a sour gas stream are contacted with an aqueous solution of a polyvalent metal chelate and a bisulfite whereby the hydrogen sulfide is converted to free sulfur and then to soluble sulfur compounds. The metal chelate is reduced to a lower oxidation state metal chelate and reduced metal chelate is subsequently oxidized with air back to the higher oxidation state and reused. The bisulfite is formed by combustion of a portion of the fluid stream and subsequent absorption of the sulfur dioxide formed thereby in a two-stage countercurrent scrubber operating at conditions favorable for high bisulfite and low sulfite formation and selective away from carbon dioxide absorption.

37 Claims, 2 Drawing Sheets

4,830,838

REMOVAL OF HYDROGEN SULFIDE FROM FLUID STREAMS WITH MINIMUM PRODUCTION OF SOLIDS

BACKGROUND OF THE INVENTION

This invention relates to a process wherein a fluid stream containing hydrogen sulfide is contacted with an aqueous solution containing a polyvalent metal chelate and the hydrogen sulfide in said steam is removed.

It is known from U.S Pat. No. 4,123,506 dated Oct. 31, 1978 and U.S. Pat. No. 4,202,864, dated May 13, 1980 that geothermal steam containing $H_2S$ can be purified by contacting the steam with a metal compound that forms insoluble metallic sulfides.

It is also known from U.S. Pat. No. 4,196,183, dated Apr. 1, 1980 that geothermal steam containing $H_2S$ can be purified by adding oxygen and passing it through an activated carbon bed.

Various processes for hydrogen sulfide control in geothermal steam are outlined in the U.S. Department of Energy Report #DOW/EV-0068 (March, 1980) by F. B. Stephens, et al.

U.S. Pat. No. 4,009,251, dated Feb. 22, 1977 discloses the removal of hydrogen sulfide from gaseous streams with metal chelates to form sulfur substantially without the formation of sulfur oxides.

In U.S. Pat. No. 4,414,817 dated Nov. 15, 1983, there is disclosed a process for the removal of hydrogen sulfide from geothermal steam. However, this process generates free sulfur or sulfur solids which must be removed. The instant process is superior in that the sulfur solids are minimized by being converted to soluble sulfur compounds.

In U.S. Pat. No. 4,451,442, dated May 29, 1984, there is disclosed a process for the removal of hydrogen sulfide from geothermal streams with minimum solid sulfer production. In this process, hydrogen sulfide is removed from fluid streams containing the same using a polyvalent metal chelate and an oxidizing agent. The oxidizing agent is preferably sulfur dioxide which can be generated by oxidizing a side stream of the hydrogen sulfide. However, in this process, the production of $SO_2$ also forms $CO_2$ which results in the formation of insoluble carbonates. These insoluble salts are troublesome and costly in geothermal power plants and other applications where solids free operation is necessary or desirable.

In U.S. Pat. No. 4,622,212, dated Nov. 11, 1986, there is described a hydrogen sulfide removal method using a chelating solution containing thiosulfate as a stabilizer.

In U.S. Pat. No. 3,446,595, dated May 27, 1969, there is described a gas purification process in which hydrogen sulfide is absorbed with bisulfite to form elemental sulfur and sulfite. This sulfite is regenerated to form bisulfite by contact with sulfur dioxide which in turn is formed by combustion of the elemental sulfur.

U.S. Pat. No. 3,859,414, dated Jan. 7, 1975, describes a process in which sulfite is reacted with hydrogen sulfide in a gas stream at thiosulfate forming conditions, e.g. a pH between 6 and 7, to form soluble sulfur compounds.

Other references which may be relevant to the instant disclosure include U.S. Pat. Nos. 4,629,608; 3,447,903; and 3,851,050.

SUMMARY OF THE INVENTION

The present invention is directed to a process wherein fluid streams containing $H_2S$ are purified by converting the $H_2S$ to soluble sulfur compounds by using a polyvalent metal chelate and a sulfite oxidizing agent.

The process of this invention has the following steps:

(a) incinerating hydrogen sulfide to form sulfur dioxide;

(b) selectively absorbing said sulfur dioxide without substantial carbon dioxide absorption in a basic aqueous solution to form sulfites in said solution essentially free of insoluble carbonates;

(c) contacting said fluid stream in a first reaction zone with aqueous solution at a pH range suitable for hydrogen sulfide removal wherein said solution contains an effective amount of polyvalent metal chelate to convert said hydrogen sulfide to sulfur and to reduce said polyvalent metal chelate to a lower oxidation state;

(d) contacting said sulfur with said sulfites to form soluble sulfur compounds;

(e) contacting said reduced polyvalent metal chelate in a second reaction zone with oxygen to reoxidize said metal chelate; and (f) recirculating said reoxidized solution back to said first reaction zone.

Advantages of the process described herein are the substantial elimination of sulfur solids and insoluble carbonate salts which foul piping, heat-exchanger surfaces, cooling tower basins and the like. Such fouling of equipment in geothermal power plants, for example, leads to costly downtime for maintenance and loss of power production. Advantages of the process, when used for gas scrubbing are elimination of the need for expensive mechanical equipment such as settlers, frothers, filters, centrifuges, melters and the like for sulfur removal. This is particularly advantageous when treating streams having low sulfur content and recovery of the sulfur does not warrant the equipment required for its removal from the process.

Furthur advantages of the process described herein include the minimization of sulfur emissions and the ability to optimize the hydrogen sulfide removal process by formation of a sulfur-solubilizing agent (sulfites) under controlled conditions to further assure complete sulfur solubilization and to minimize the use of makeup reagents such as chelating solution and caustic.

BRIEF DESCRIPTION OF THE DRAWINGS

FIG. 2 illustrates a process in which this invention is applied to the removal of hydrogen sulfide form a sour gas stream such as a natural gas stream, refinery gas, synthesis gas, or the like.

In FIG. 1 the geothermal steam from line 2 is used to power a steam turbine 4 which is connected to an electric power generator 6. Line 18 directly supplies steam from line 2 to the steam turbine 4. The turbine 4 exhausts through line 8 to a condenser 10. Cooling water containing chelated iron (ferric chelate) and sulfites from line 28 is sprayed into condenser 10 for this condensation and passes from the condenser 10 through line 14 to the hot well 16 operating at 100°–125° F. Noncondensable gases such as $CO_2$, $H_2$, $CH_4$, $N_2$, $O_2$ and part of the H$_2$S are removed from the main condenser 10 through line 36. If desired, a conventional steam ejector or ejectors may be employed in line 36 to create a partial vacuum or low pressure zone. The exhaust steam from line 36, including the H$_2$S and non-condensable gas is fed to an incinerator or SO$_2$ generator 54 for oxidation of the H$_2$S to SO$_2$. An oxygen-containing gas such as air, oxygen, or mixtures thereof is supplied to the generator 54 by line 55. The SO$_2$ generator 54 is a conventional catalytic incinerator, however, a thermal incinerator may be used if desired.

Figure 1:
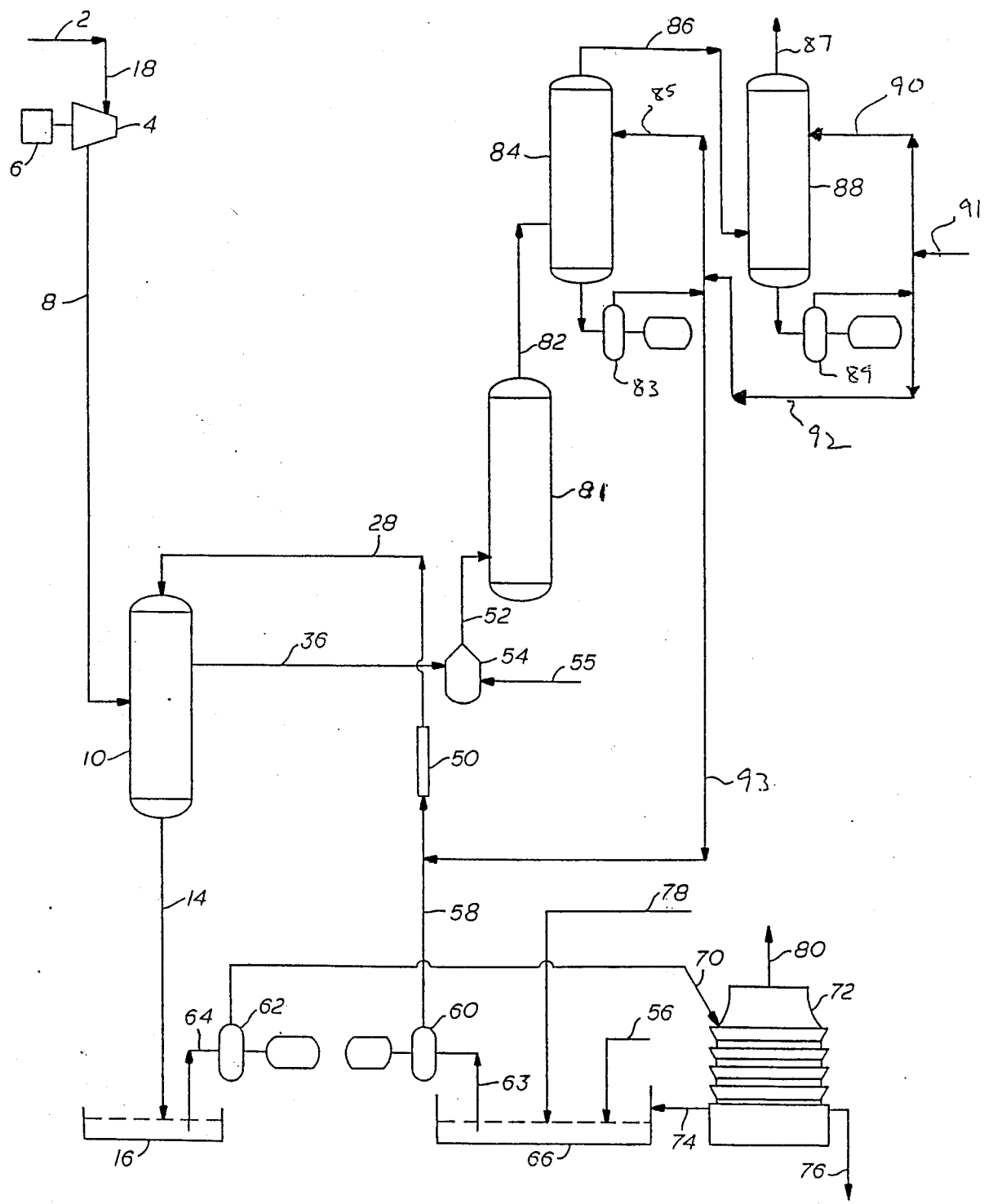
FIG. 1 illustrates a process in which this invention is applied for the oxidation of hydrogen sulfide contained in a liquid stream produced by the condensation of geothermal steam.

Sufficient amounts of polyvalent metal chelate is added after start-up to the cold well 66 by line 56 to make up for the amounts lost by continuous blow down through line 76. In a similar manner, caustic solutions such as aqueous sodium hydroxide are added, if needed, by line 78 to the cold well 66 to adjust or maintain the pH of the recirculating solution within the desired range of 5 to 11 and preferably 7 to 9.

The aqueous solution in the cold well 66 is withdrawn by line 63 into pump 60 and pumped through line 58 to the static mixer 50 and thence to condenser 10 via line 28.

The aqueous solution in the hot well 16 is withdrawn by line 64 into pump 62 and pumped through line 70 to the cooling tower 72 where the solution is sprayed into the tower and oxidized by air circulation. Line 76 is provided for continuous solution withdrawal. About 10–20 percent of the steam from line 2 is continuously withdrawn from line 76 which is typically reinjected into the underground steam-bearing formation. Line 74 is provided to allow the cooled solution to recycle back to the cold well 66. The cooling tower 72 is vented to the atmosphere at 80 with substantially no H$_2$S being present.

The SO$_2$ generated in the incinerator, along with the non-condensable gases and combustion products thereof, is fed via line 52 to optional quench vessel 81 and thence through line 82 to a first-stage scrubbing vessel 84 where it is absorbed by contact with alkali metal and sulfite/bisulfite solution at a pH of 4–7 circulated via pump 83 and recirculation loop 85. Unabsorbed gases from scrubber 84 are fed through line 86 to second-stage scrubber 88 where residual SO$_2$ is absorbed to less than 10 ppm in the gas which is then vented through line 87. A solution of alkali metal, bisulfite and sulfite at a pH of 8.5–9.5 is circulated through scrubber 88 by means of pump 89 and second-stage recirculation loop 90. Make-up alkali metal hydroxide is added through line 91 to recirculation loop 90 to maintain the desired pH and also to ensure that the alkali metal is reacted with sulfite in the recirculation loop 90 to form bisulfite, so that absorption of Co$_2$ in scrubber 88 and the resultant formation of carbonates therein is substantially avoided. Absorption solution is fed from recirculation loop 90 through line 92 to recirculation loop 85 to maintain the desired pH and scrubbing liquor level in scrubber 84. Scrubbing liquor containing sulfite and/or bisulfite is fed from recirculation loop 85 through line 93 to line 58 in a sufficient amount to maintain soluble sulfur-forming conditions in condenser 10.

Figure 2:
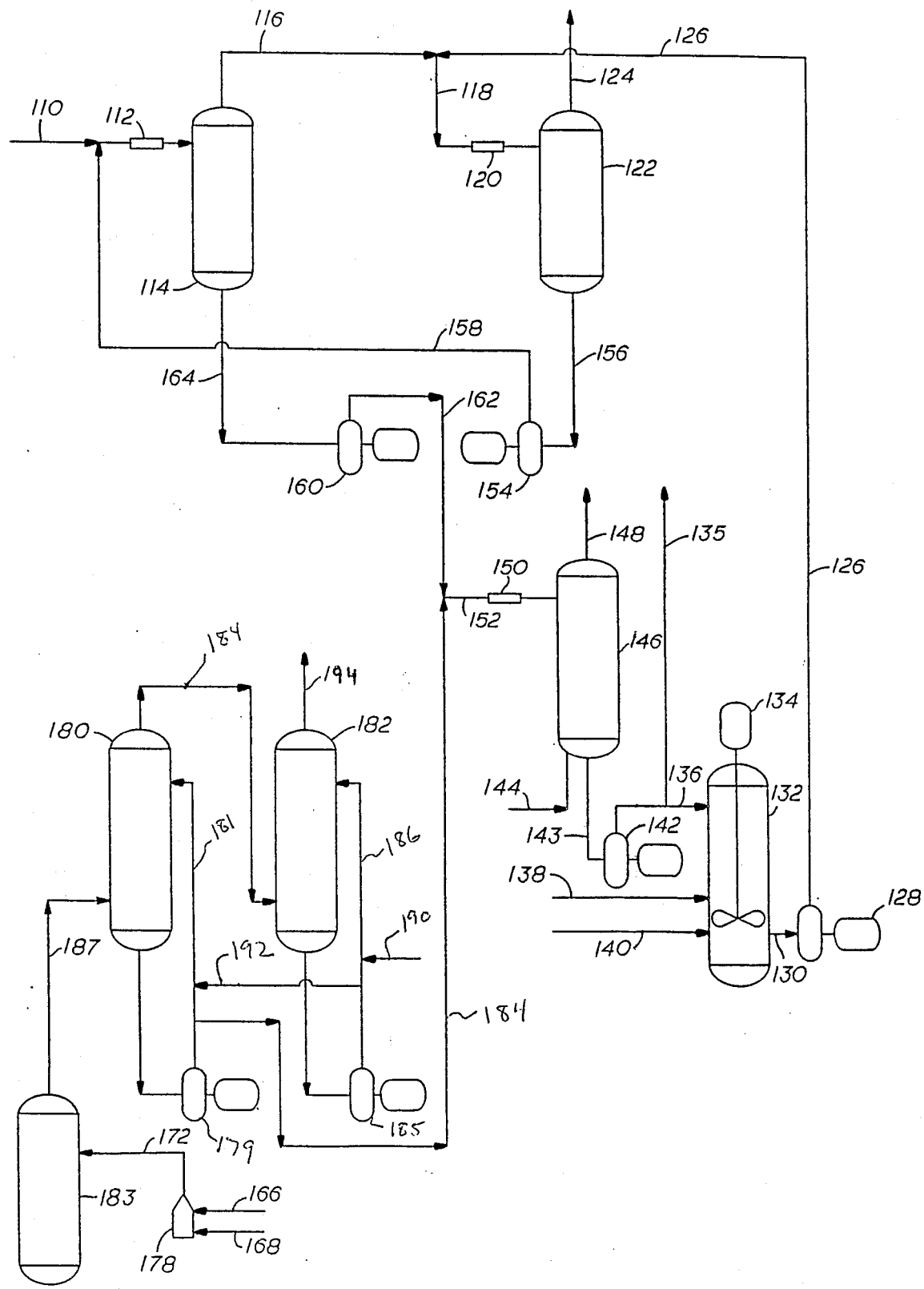

In FIG. 2, a sour gas feed is led by line 110 where it is combined with the aqueous solution from line 158 and thence to a static mixer 112 for good gas-liquid contact. The combined streams are fed into the first separator 114. The gaseous effluent from the separator 114 is led overhead by line 116 where it is combined with the recycled aqueous solution in line 126 and fed by line 118 to a static mixer 120 and then to a second gas-liquid separator 122. The overhead gas from the second separator 122 which is the purified or sweetened gas product of this process is removed by line 124 while the liquid bottoms are removed by line 156, pump 154, and recycled by line 158 to the first separator 114.

The bottoms from the first separator 114 are removed by line 164 to the pump 160 and pumped through line 162 where it is mixed, with or without static mixer 150, with aqueous solution from line 184. The mixed bottoms and liquid effluent from lines 162 and 184 respectively are passed through line 152 into an oxidation rector 146. An oxygen-containing gas is supplied to the oxidizer 146 by the line 144 so that the polyvalent metal chelate is oxidized to its higher state of oxidation. The non-absorbed gases are purged overhead by line 148. The bottoms from the oxidizer 146 are removed by line 143 to pump 142. A purge line 135 is provided for the continuous removal of a portion of the aqueous solution from the pump line 136.

The pump line 136 feeds into a mixing tank 132 where a mixer 134 stirs the chemicals that are added. Line 138 is provided for the addition of aqueous caustic solution to the tank 132 so that the pH can be adjusted within the desired range. Line 140 is provided for the addition of make up polyvalent metal chelate. The contents of the mixing tank 132 are removed by line 130 to the pump 128 for recycle back to the second separator 122 by line 126.

Hydrogen sulfide is fed from any convenient source such as a pressurized tank or the like (not shown) through line 166, with an oxygen-containing gas such as air, oxygen, or a mixture thereof supplied through line 168, to SO$_2$ generator or incinerator 178. The SO$_2$ is routed through line 172 into an optional quench vessel 183 and thence through line 187 to a first scrubber 180. Scrubbing solution is circulated through scrubber 180 for contact with and absorption of the SO$_2$ by means of pump 179 and recirculation loop 181. Partially scrubbed SO$_2$-containing gas is taken overhead by line 184 to a second scrubbing vessel 182 through which a scrubbing solution is circulated by means of pump 185 and recirculation loop 186. The scrubbed gas (less than 10 ppmv SO$_2$) is purged overhead from scrubber 182 by line 194. Makeup caustic or other alkali metal or ammonium hydroxide is introduced from line 190 into the recirculation loop 186 at a sufficient rate to maintain a pH in the range of about 8.6–9.5, and so that carbonate formation in the scrubbers 180,182 is substantially avoided by reaction of the alkali metal to form sulfite and/or bisulfite before being placed in contact with the SO$_2$-containing gas which may also contain CO$_2$. Scrubbing solution from scrubber 182 is introduced to recirculation loop 181 through line 192 from recirculation loop 186 at a sufficient rate to maintain a pH of about 4–7 in the scrubbing solution in first scrubber 180. Scrubbing solution containing sulfite and/or bisulfite is fed to line 152 through line 184 from recirculation loop 181 to maintain soluble sulfur-forming conditions in oxidizer 146 as described above.

Alternatively, the sulfite and/or bisulfite solution or the the metal chelate solution may be fed to the process at points other than described above.

DETAILED DESCRIPTION OF THE INVENTION

The polyvalent metal chelates used herein are aqueous soluble, polyvalent metal chelates of a reducible polyvalent metal, i.e., a polyvalent metal which is capable of being reduced and a chelating or complexing agent capable of holding the metal in solution. As used herein, the term polyvalent metal includes those reducible metals having a valence of two or more. Representative of such polyvalent metals are chromium, cobalt, copper, iron, lead, manganese, mercury, molybdenum, nickel, palladium, platinum, tin, titanium, tungsten and vanadium. Of said polyvalent metals, iron, copper and nickel are most advantageously employed in preparing the polyvalent metal chelate, with iron being most preferred.

The term "chelating agent" is well-known in the art and references are made thereto for the purposes of this invention. Chelating agents useful in preparing the polyvalent metal chelate of the present invention include those chelating or complexing agents which form a water-soluble chelate with one or more of the aforedescribed polyvalent metals. Representative of such chelating agents are the aminopolycarboxylic acids, including the salts thereof, nitrilotriacetic acid, N-hydroxyethyl aminodiacetic acid and the polyaminocarboxylic acids including enthylenediaminetetraacetic acid, N-hydroxyethylethylenediaminetriacetic acid, diethylenetriaminepentaacetic acid, cyclohexene diamine tetraacetic acid, triethylene tetraamine hexaacetic acid and the like; aminophosphonate acids such as ethylene diamine tetra (methylene phosphonic acid), aminotri (methylene phosphonic acid), diethylenetriamine penta (methylene phosphonic acid); phosphonate acids such as 1-hydroxy ethylidene-1, 1-diphosphonic acid 2-phosphonoacetic acid, 2-phosphono propionic acid, and 1-phosphono ethane-1, 2-dicarboxylic acid; polyhydroxy chelating agents such as monosaccharides and sugars (e.g., disaccharides such as sucrose, lactose and maltose), sugar acids (e.g., gluconic or glucoheptanoic acid); other polyhydric alcohols such as sorbitol and mannitol; and the like. Of such chelating agents, the polyaminocarboxylic acids, particularly ethylenediaminetetraacetic and N-hydroxyethylethylenediaminetriacetic acids, are most advantageously employed in preparing the polyvalent metal chelate used herein. Most preferably, the polyvalent metal chelate is the chelate of a ferric iron with a polyaminocarboxylic acid, with the most preferred polyaminocarboxylic acids being selected on the basis of the process conditions to be employed. Ethylenediaminetetraacetic acid and N-hydroxyethylethylenediaminetriacetic acid are generally particularly preferred.

For the purpose of this invention, an effective amount of a polyvalent metal chelate is that amount ranging from about a stoichiometric amount based n the hydrogen sulfide absorbed to the amount represented by the solubility limit of the metal chelate in the solution. In like manner, an effective amount of an oxidizing agent (sulfite and/or bisulfite) is that amount ranging from about a stoichiometric amount based on the free sulfur formed to about five times the stoichiometric amount.

Sulfite and/or bisulfite (collectively referred to herein as "sulfites") is employed as an oxidizing agent in the present process to maintain conditions in at least the second (oxidation-regeneration) reaction zone, and preferably also the first reaction zone, suitable for the formation of soluble sulfur compounds, e.g. thiosulfate, and to avoid the formation of solid elemental sulfur therein. The source of the sulfites employed is preferably the aqueous absorption effluent of $H_2S$ combustion products, and the combustion products are preferably obtained by combustion or catalytic incineration of a portion of the $H_2S$-containing stream treated by the process. The aqueous absorption is preferably effected in a two-stage countercurrent scrubber using basic alkali metal hydroxide or ammonium hydroxide at conditions selective away from $CO_2$ absorption. This is accomplished, for example, by adding the makeup alkali metal hydroxide to a recirculation line or loop so that the alkali metal is contacted with the $SO_2$ containing gas in the form of sulfites so the absorption solution is essentially free of alkali metal hydroxide which could absorb $CO_2$ and concomitantly form carbonates which are undesirable in a desirably solidsfree system, and which are particularly undesirable where the aqueous chelating solution is cooled in a cooling tower. In such a two-stage scrubbing system, the first stage scrubber is preferably operated at a pH of about 4.5, e.g. about 4–5, while that of the second stage is about 9, e.g. about 8.5–9.5. This two-stage scrubbing is thus preferred because of no excess alkalinity in the sulfite/bisulfite effluent, i.e. a high proportion of bisulfite relative to sulfite which is economical by virtue of less makeup caustic being used, very low $SO_2$ slippage (usually less than 10 ppm) and substantially no alkali metal carbonates in the sulfite/bisulfite effluent due to the selectivity away from $CO_2$.

CONTROL 1

To a 1-liter agitated reactor in a constant temperature bath was added about 500 water, 14.8 (0.0448 mole) ferric iron-N(hydroxyethyl)-ethylene diaminetriacetic acid chelate ($FE^{+2}$.HEDTA), and 1.15 (0.0148 mole) of sodium sulfide as a stimulant for the absorption of 0.0148 mole of $H_2S$. The pH was adjusted to 7.0 with $NH_4OH$ or HCl. The reaction was carried out for 30 minutes at 20° C during which time substantially all of the sulfide was oxidized by the ferric iron to elemental sulfur. The iron was reduced to the ferrous state.

The total reaction solution was then weighed and filtered onto a tared filter paper for gravimetric determination of weight percent sulfur solids. The tared filter paper was dried and weighed. The weight percent sulfur solids, based on solution weights, was calculated. The filtrate was analyzed for weight percent thiosulfate ($S_2O_3^=$) and sulfate ($SO_4^=$) by ion chromatography.

Analytical results showed 966 ppm sulfur solids and 164 ppm sodium thiosulfate ($Na_2S_2O_3$). Sulfate ($SO_4^=$) was below detectable limits, i.e., less than 110 ppm.

EXAMPLE I

The reaction was carried out using the method and conditions of Control 1 except that 2.95 of sodium sulfite was added. This represents a stoichiometric amount of 50% excess with respect to the sodium sulfide of Control 1.

Analytical results showed 149 ppm sulfur solids and 3440 ppm sodium thiosulfate.

EXAMPLE II & CONTROL 2

The reaction was carried out using the method and conditions of control 1 except the pH was controlled at 8.0. With no sulfite addition (Control 2) analysis showed 953 ppm sulfur solids and 232 ppm sodium thiosulfate. With sulfite addition, (Example II) analysis showed only 53 ppm sulfur solids and 3412 ppm sodium thiosulfate.

EXAMPLE III & CONTROL 3

The reaction was again carried out using the method and conditions of Control 1 except the pH was controlled at 6.0.

With no sulfite addition, (Control 3 ) analysis showed 968 ppm sulfur solids and 149 ppm sodium thiosulfate. With sulfite addition, (Example III) analysis showed 163 ppm sulfur solids and 3370 ppm sodium thiosulfate.

CONTROL 4

The reaction was again carried out using the method and conditions of Control 1, except that pH was not controlled. The pH fell to about 3.6 resulting in nearly complete loss of $H_2S$ abatement efficiency and loss of $SO_2$ absorption. Most of the $Na_2S_2O_3$ was probably formed initially at the higher pH.

Results of the Examples and Controls are shown in Table 1.

TABLE I

| | pH | ppm Solids | ppm $Na_2S_2O_3$ | Remarks |
|---|---|---|---|---|
| Control 1 | 7.0 | 966 | 164 | No sulfite addition |
| Example I | 7.0 | 149 | 3440 | With sulfite addition |
| Control 2 | 8.0 | 953 | 232 | No sulfite addition |
| Example II | 8.0 | 53 | 3412 | With sulfite addition |
| Control 3 | 6.0 | 968 | 149 | With sulfite addition |
| Example III | 6.0 | 163 | 3370 | With sulfite addition |
| Control 4 | 3.6–8.0 | 58 | 2054 | No pH contr/with $SO_2$ feed |

EXAMPLES IV

A pilot scale two-stage countercurrent scrubber was used to scrub $CO_2$ and $SO_2$-containing gas streams. The raw gas stream was fed consecutively through the first stage scrubber and then through the second stage scrubber. Makeup caustic was added to the recirculation line of the second stage scrubber to maintain a pH of approximately 9.0. Scrubbing solution from the second-stage scrubber was in turn added to the first stage scrubber to control the pH at approximately 4.5. The gases scrubbed contained 1% $SO_2$, 10% $CO_2$, 4.5% $O_2$ and the balance $N_2$, saturated with water at 140° F. (Example IV) and at 180° F. (Example V); and 5% $SO_2$, 10% $CO_2$, 4.5% $O_2$ (Example VI). All streams were scrubbed to less than 1 ppmv $SO_2$, and the aqueous effluent of the first stage scrubber contained a high proportion of $NaHSO_3$, and no detectable free NaOh which is required for efficient solids control.

What is claimed is:

1. A continuous process for removing hydrogen sulfide from a fluid stream, comprising:
   incinerating hydrogen sulfide to form sulfur dioxide;
   selectively absorbing said sulfur dioxide in an alkaline aqueous solution without substantial carbon dioxide absorption to form a solution of sulfites essentially free of insoluble carbonates;
   contacting said fluid stream in a first reaction zone with an aqueous solution at a pH range suitable for hydrogen sulfide removal wherein said solution contains an effective amount of polyvalent metal chelate to convert said hydrogen sulfide to sulfur and to reduce said polyvalent metal chelate to a lower oxidation state;
   contacting said sulfur with said sulfites to from soluble sulfur compounds;
   contacting said reduced polyvalent metal chelate in a second reaction zone with oxygen to reoxidize said polyvalent metal chelate; and
   recirculating said reoxidized polyvalent metal chelate back to said fluid stream/aqueous chelate solution contacting step.

2. The process of claim 1, wherein hydrogen sulfide remaining in said fluid stream after said fluid stream/polyvalent metal chelate contacting step is supplied to said hydrogen sulfide incineration step.

3. The process of claim 1, wherein said sulfites are added to said polyvalent metal chelate solution for conversion of said hydrogen sulfide to said sulfur and then to said soluble sulfur compounds in said first reaction zone.

4. The process of claim 1, wherein said sulfites are added to said reduced polyvalent metal chelate solution for conversion of said sulfur to said soluble sulfur compounds in said second reaction zone.

5. The process of claim 1, wherein said fluid stream comprises geothermal steam.

6. A continuous process for removing hydrogen sulfide from geothermal steam, comprising:
   condensing said geothermal steam in a first reaction zone with an aqueous solution of a pH range suitable for hydrogen sulfide removal to form a stream of non-condensable gases of reduced hydrogen sulfide content wherein said solution contains an effective amount of polyvalent metal chelate to convert said hydrogen sulfide to sulfur and to reduce said polyvalent metal chelate to a lower oxidation state, and an effective amount of sulfites to substantially convert said sulfur to soluble sulfur compounds;
   contacting said reduced polyvalent metal chelate with oxygen in a second reaction zone to reoxidize said polyvalent metal chelate;
   recirculating said reoxidized polyvalent metal chelate to said first reaction zone;
   incinerating the remainder of said hydrogen sulfide in said non-condensable gas stream to form sulfur dioxide;
   absorbing said sulfur dioxide with a scrubbing solution at conditions effective to form sulfites to substantially remove said sulfur dioxide; and
   supplying said sulfites from said absorption step to said first reaction zone.

7. The process of claim 6, wherein said absorption comprises:
   contacting said non-condensable gas stream in a first scrubbing zone with a first scrubbing solution at a pH of from about 4 to about 5 to absorb a portion of said sulfur dioxide therein and produce a non-condensable gas stream of reduced sulfur dioxide content; and
   contacting said non-condensable gas stream of reduced sulfur dioxide content in a second scrubbing zone with a second scrubbing solution at a pH of from about 8.5 to about 9.5 to substantially remove said sulfur dioxide from said non-condensable gases.

8. the process of claim 7, wherein said second scrubbing solution is continuously removed, wherein a first portion thereof is mixed with alkali metal or ammonium hydroxide to form bisulfite and recirculated to said second scrubber to maintain said second scrubbing solution pH, wherein a second portion thereof is introduced to said first scrubbing solution in said first scrubber, and wherein a portion of said first scrubber solution is supplied to said first reaction zone.

9. The process of claim 8, wherein said first and second scrubbing solutions are substantially free of free alkali metal or ammonium ions to operate said first and second scrubbers selectively away from carbon dioxide absorption.

10. The process of claim 6, wherein said sulfites supplied to said first reaction zone comprise predominately bisulfite.

11. The process as set forth in claim 6, wherein the amount of metal chelate is from about stoichiometric based on the hydrogen sulfide absorbed to the solubility limit of said metal chelate in said solution.

12. The process as set forth in claim 6, wherein the amount of sulfites in said first reaction zone is from about stoichiometric based on the free sulfur formed to about five times the stoichiometric amount.

13. The process as set forth in claim 6 wherein the first and second reaction zones are maintained at a temperature in the range from about 0° to 50° C.

14. The process as set forth in claim 6 wherein said polyvalent metal chelate is an iron chelate.

15. The process of claim 14 wherein the iron chelate is a chelate of iron with an aminopolycarboxylic acid.

16. The process of claim 15 wherein the aminopolycarboxylic acid is selected from the group consisting of ethylenediaminetetraacetic acid, diethylenetriamine pentaacetic acid, N-hydroxy-ethylethylenediaminetriacetic acid, diethylene-triaminepentaacetic acid, cyclohexenediaminetetraacetic acid, triethylenetetraaminehexaacetic acid, nitrilotriacetic acid, and N-hydroxyethyliminodiacetic acid.

17. The process of claim 14 wherein the iron chelate is a chelate of iron with an amine phosphonic acid.

18. The process of claim 17 wherein the amine phosphonic acid is selected from the group consisting of ethylenediamine tetra(methylene phosphonic acid), aminotri(methylene phosphonic acid), and diethylenetriamine penta(methylene phosphonic acid).

19. The process of claim 14 wherein the iron chelate is a chelate of iron with a phosphonate acid.

20. In a continuous process for removing hydrogen sulfide from a fluid stream containing hydrogen sulfide which comprises: (a) contacting said stream in a first reaction zone with an aqueous solution at a pH range suitable for removing hydrogen sulfide, said solution containing an effective amount of a polyvalent metal chelate and an effective amount of an oxidizing agent capable of oxidizing elemental sulfur to soluble sulfur compounds whereby said hydrogen sulfide is converted to free sulfur and then to soluble sulfur compounds and said polyvalent metal chelate is reduced to a lower oxidation state metal chelate, (b) contacting said solution containing reduced polyvalent metal chelate in a second reaction zone with an oxygen containing gas stream whereby said metal chelate is continuously reoxidized, and (c) continuously recirculating said reoxidized solution back to said first reaction zone; the improvement comprising:
incinerating hydrogen sulfide to form sulfur dioxide;
selectively absorbing said sulfur dioxide in an alkaline aqueous solution without substantial carbon dioxide absorption to form a solution of sulfites essentially free of insoluble carbonates; and
employing said sulfites as said oxidizing agent in said first reaction zone;
wherein said aqueous solution in said first reaction zone is essentially free of insoluble carbonates.

21. The improvement of claim 20, wherein hydrogen sulfide remaining in said fluid stream after said first reaction zone contacting is supplied to said hydrogen sulfide incineration.

22. The improvement of claim 20, wherein said fluid stream comprises geothermal steam.

23. The improvement of claim 22, wherein said geothermal steam is condensed in said first reaction zone to form a stream of noncondensable gases of reduced hydrogen sulfide content.

24. The improvement of claim 23, wherein said noncondensable gas stream is supplied to said hydrogen sulfide incineration step.

25. The improvement of claim 24, wherein said incinerated non-condensable gas stream is contacted in a first scrubbing zone with a first scrubbing solution at a pH of from about 4-5 to absorb a portion said sulfur dioxide therein and produce a non-condensable gas stream of reduced sulfur dioxide content; and wherein said non-condensable gas stream of reduced sulfur dioxide content is contacted in a second scrubbing zone with a second scrubbing solution at a pH of about 8.5-9.5 to substantially remove said sulfur dioxide from said non-condensable gas stream.

26. The improvement of claim 25, wherein said first scrubbing solution is continuously removed, wherein a first portion thereof is mixed with alkaline metal or ammonium hydroxide to form bisulfite and recirculated to said first scrubber to maintain said first scrubbing solution pH, wherein a second portion thereof is introduced to said first scrubbing solution in said first scrubber, and wherein a portion of said first scrubber solution is supplied to said first reaction zone.

27. The improvement of claim 26, wherein said first and second scrubbing solutions are substantially free of free alkaline or ammonium ions to operate said first and second scrubbers selectively away from carbon dioxide absorption.

28. The improvement of claim 27, wherein said sulfites supplied to said first reaction zone comprise predominantly bisulfite.

29. The improvement as set forth in claim 20, wherein the amount of metal chelate is from about stoichiometric based on the hydrogen sulfide absorbed to the solubility limit of said metal chelate in said solution.

30. The improvement as set forth in claim 20, wherein the amount of sulfites in said first reaction zone is from about stoichiometric based on the free sulfur formed to about five times the stoichiometric amount.

31. The improvement as set forth in claim 20, wherein the first and second reaction zones are maintained at a temperature in the range from about 0° to 50° C.

32. The improvement as set forth in claim 20, wherein said polyvalent metal chelate is an iron chelate.

33. The improvement of claim 32, wherein the iron chelate is a chelate of iron with an aminopolycarboxylic acid.

34. The improvement of claim 33, wherein the aminopolycarboxylic acid is selected from the group consisting of ethylenediaminetetraacetic acid, diethylenetriamine pentaacetic acid, N-hydroxy-ethylethylenediaminetriacetic acid, diethylene-triaminepentaacetic acid, cyclohexenediaminetetraacetic acid, triethylenetetraaminehexaacetic acid, nitrilotriacetic acid, and N-hydroxyethyliminodiacetic acid.

35. The improvement of claim 32, wherein the iron chelate is a chelate of iron with an amine phosphonic acid.

36. The improvement of claim 35, wherein the amine phosphonic acid is selected from the group consisting of ethylenediamine tetra(methylene phosphonic acid), aminotri(methylene phosphonic acid), and diethylenetriamine penta(methylene phosphonic acid).

37. The process of claim 32, wherein the iron chelate is a chelate of iron with a phosphonate acid.

* * * * *

UNITED STATES PATENT AND TRADEMARK OFFICE
CERTIFICATE OF CORRECTION

PATENT NO. : 4,830,838

DATED : May 16, 1989

INVENTOR(S) : Kent et al.

It is certified that error appears in the above-identified patent and that said Letters Patent is hereby corrected as shown below:

Col. 1, line 39; change "sulfer" to --sulfur--.

Col. 2, line 56; change "form" to --from--.

Col. 3, line 6; insert a space between "$SO_2$" and "generator".

Col. 3, line 47; change "8.6-9.5" to --8.5 to 9.5--.
Col. 3, line 53; change "$Co_2$" to --$CO_2$--.
Col. 4, line 62; delete "the" between "the" and "metal".

Col. 5, line 23; change "enthylenediaminetetraacetic" to --ethylenediaminetetraacetic--.

Col. 5, line 52; change "n" between "based" and "the" to --on--.

Col. 6, line 44; change "solds" to --solids--.

Col. 7, line 46; insert --and the balance $N_2$ saturated with water at 180°F-- between "$O_2$" and "(Example VI)".

Col. 7, line 49; change "NaOh" to --NaOH--.

Col. 7, line 67; change "from" to --form--.

UNITED STATES PATENT AND TRADEMARK OFFICE
CERTIFICATE OF CORRECTION

PATENT NO. : 4,830,838

DATED : May 16, 1989

INVENTOR(S) : Kent et al.

It is certified that error appears in the above-identified patent and that said Letters Patent is hereby corrected as shown below:

Col. 4, line 48, change "8.6-9.5" to --8.5 to 9.5--

Signed and Sealed this

Second Day of October, 1990

Attest:

HARRY F. MANBECK, JR.

*Attesting Officer*  *Commissioner of Patents and Trademarks*